US009456202B2

United States Patent
Lu et al.

(10) Patent No.: US 9,456,202 B2
(45) Date of Patent: Sep. 27, 2016

(54) ATTACHABLE THREE-DIMENSIONAL SCAN MODULE

(71) Applicant: Etron Technology, Inc., Hsinchu (TW)

(72) Inventors: Chao-Chun Lu, Taipei (TW); Le-Shan Hsueh, Taipei (JP); Wen-Kuo Lin, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 14/807,903

(22) Filed: Jul. 24, 2015

(65) Prior Publication Data

US 2016/0029009 A1  Jan. 28, 2016

Related U.S. Application Data (60) Provisional application No. 62/028,324, filed on Jul. 24, 2014.

(30) Foreign Application Priority Data

Aug. 11, 2014  (TW) .............................. 103127563 A (51) Int. Cl.
*H04N 1/04* (2006.01)
*H04N 13/02* (2006.01)
(Continued)

(52) U.S. Cl.
CPC ........ *H04N 13/0296* (2013.01); *G01B 5/0004* (2013.01); *G01B 11/2545* (2013.01); *G01B 21/042* (2013.01); *G06T 5/20* (2013.01);
(Continued)

(58) Field of Classification Search
CPC .............. G06K 9/6202; G06K 9/6215; G06T 2207/10004; G06T 2207/10024; G06T 2207/20021; G06T 7/0002; G06T 7/001; G06T 7/408; G06T 15/10; G06T 2200/04; G02B 27/2214; G03B 42/02; G06Q 20/105; G06Q 30/00
USPC ......... 378/4, 11, 197, 205, 38, 98.8; 463/39, 463/31, 36, 37; 235/375; 345/156, 419; 348/E13.003, E13.075, 43, 47, 49, 51, 348/239, 46, E13.001, E13.074, E13.06, 348/E5.024, E5.096; 382/141, 195, 154, 382/266, 199, 284, 294, 255, 107, 313; 455/456.1; 358/473, 483
See application file for complete search history.

(56) References Cited

U.S. PATENT DOCUMENTS

8,610,758 B2 * 12/2013 Cheng ................. H04N 13/026
348/46
8,638,985 B2 * 1/2014 Shotton .............. G06K 9/00369
382/103
(Continued)

*Primary Examiner* — Negussie Worku
(74) *Attorney, Agent, or Firm* — Winston Hsu; Scott Margo (57) ABSTRACT

An attachable three-dimensional scan module includes an attachable unit, at least two image sensing units, a depth map generation unit, and an output interface. The attachable unit fixes the attachable three-dimensional scan module on a mobile device. When the mobile device is moved around an object, a first image sensing unit and a second image sensing unit of the at least two image sensing units capture a plurality of first images including the object and a plurality of second images including the object, respectively. A plurality of depth maps generated by the depth map generation unit, the plurality of first images, and the plurality of second images are used for generating a color three-dimensional scan result corresponding to the object. The output interface outputs the color three-dimensional scan result, or the plurality of first images, the plurality of second images, and the plurality of depth maps.

24 Claims, 11 Drawing Sheets

(51) Int. Cl.
*G06T 5/20* (2006.01)
*G01B 11/25* (2006.01)
*G01B 21/04* (2006.01)
*G01B 5/00* (2006.01)
*H04N 13/00* (2006.01)

(52) U.S. Cl.
CPC ...... H04N13/0239 (2013.01); H04N 13/0246 (2013.01); H04N 13/0271 (2013.01); *H04N 2013/0077* (2013.01); *H04N 2013/0081* (2013.01)

(56) References Cited

U.S. PATENT DOCUMENTS

| | | | | |
|---|---|---|---|---|
| 8,970,678 B2* | 3/2015 | Ito | ............................ | A63F 13/10 348/47 |
| 2004/0075654 A1* | 4/2004 | Hsiao | ...................... | G06T 15/40 345/418 |
| 2011/0019617 A1* | 1/2011 | Ho | ........................ | H04W 28/06 370/328 |
| 2011/0053641 A1* | 3/2011 | Lee | ........................ | G06F 1/1626 455/556.1 |
| 2011/0141237 A1* | 6/2011 | Cheng | ................... | H04N 13/026 348/46 |
| 2011/0199505 A1* | 8/2011 | Teranishi | ................ | H04N 5/232 348/222.1 |
| 2013/0010207 A1* | 1/2013 | Valik | ..................... | G06F 3/0304 348/734 |
| 2013/0100284 A1* | 4/2013 | Fujii | ..................... | A61B 5/1113 348/135 |
| 2013/0106694 A1* | 5/2013 | Tanaka | ................... | G03B 35/18 345/157 |
| 2013/0106997 A1* | 5/2013 | Kim | .................... | H04N 13/0203 348/43 |
| 2015/0092016 A1* | 4/2015 | Chen | ..................... | G01B 11/25 348/46 |
| 2015/0113356 A1* | 4/2015 | Ken | ..................... | H01L 25/0657 714/764 |
| 2015/0200776 A1* | 7/2015 | Kao | ...................... | H04L 9/0844 713/171 |
| 2015/0296154 A1* | 10/2015 | Laroia | ................... | H04N 5/2257 348/262 |

* cited by examiner

ATTACHABLE THREE-DIMENSIONAL SCAN MODULE

CROSS REFERENCE TO RELATED APPLICATIONS

This application claims the benefit of U.S. Provisional Application No. 62/028,324, filed on Jul. 24, 2014 and entitled "Attachable 3D color scan module with small form factor," the contents of which are incorporated herein by reference.

BACKGROUND OF THE INVENTION

1. Field of the Invention

The present invention relates to an attachable three-dimensional scan module, and particularly to an attachable three-dimensional scan module that can have smaller profile and volume, be attached to any mobile device, and have a better scanning resolution.

2. Description of the Prior Art

In the prior art, a stereo scanner with fixed image sensing units can be utilized to scan an object which is rotated 360 degrees to generate a three-dimensional scan result corresponding to the object. To get a better scanning resolution corresponding to the object, some stereo scanners provided by the prior art can be additionally installed a predetermined light source to get the better scanning resolution corresponding to the object, wherein the predetermined light source can emit laser light or have a predetermined light pattern. However, the above mentioned stereo scanners with the predetermined light source only generate a monochromatic light three-dimensional scan result corresponding to the object. In addition, the prior art provides another stereo scanner that can include "circular camera ring" or "multi-camera dome". However, a stereo scanner with "circular camera ring" or "multi-camera dome" not only needs a plurality of cameras, but also has a huge profile. Therefore, the prior art is not a good choice for a user.

SUMMARY OF THE INVENTION

An embodiment of the present invention provides an attachable three-dimensional scan module. The attachable three-dimensional scan module includes an attachable unit, at least two image sensing units, a depth map generation unit, and an output interface. The attachable unit is used for fixing the attachable three-dimensional scan module on a mobile device or a user, wherein a size of the attachable three-dimensional scan module is less than a size of the mobile device or a hand of the user. When the attachable three-dimensional scan module is moved around an object, a first image sensing unit of the at least two image sensing units captures a plurality of first images including the object, and a second image sensing unit of the at least two image sensing units captures a plurality of second images including the object, wherein each first image of the plurality of first images corresponds to a second image of the plurality of second images, when the first image sensing unit generates the each first image, a corresponding distance exists between the attachable three-dimensional scan module and the object, wherein the plurality of first images or the plurality of second images are color images, and the corresponding distance is varied with time. The depth map generation unit is used for generating a corresponding depth map according to the each first image and the second image, wherein a plurality of depth maps generated by the depth map generation unit according to the plurality of first images and the plurality of second images, the plurality of first images, and the plurality of second images are used for generating a color three-dimensional scan result corresponding to the object. The output interface is used for outputting the color three-dimensional scan result, or the plurality of first images, the plurality of second images, and the plurality of depth maps.

The present invention provides an attachable three-dimensional scan module. Compared to the prior art, because the attachable three-dimensional scan module has smaller profile and volume, the attachable three-dimensional scan module can be attached to arbitrary mobile device or a user. In addition, when a first image sensing unit of the attachable three-dimensional scan module captures a plurality of first images including an object and a second image sensing unit of the attachable three-dimensional scan module captures a plurality of second images including the object, the first image sensing unit and the second image sensing unit can be swung to let the object be always located at an intersection of a line determined by a center of the first image sensing unit and the object and a line determined by a center of the second image sensing unit and the object, or make a baseline between the first image sensing unit and the second image sensing unit be varied with a corresponding distance between the attachable three-dimensional scan module and the object to let the object be always located at the intersection of the line determined by the center of the first image sensing unit and the object and the line determined by the center of the second image sensing unit and the object, or make the first image sensing unit and the second image sensing unit be swung and the baseline between the first image sensing unit and the second image sensing unit be varied with the corresponding distance between the attachable three-dimensional scan module and the object to let the object be always located at the intersection of the line determined by the center of the first image sensing unit and the object and the line determined by the center of the second image sensing unit and the object. In addition, the plurality of first images or the plurality of second images are color images, and the corresponding distance is varied with time. Therefore, compared to the prior art, no matter how the object is mover or rotated, the attachable three-dimensional scan module can always make the object be located at the intersection of the line determined by the center of the first image sensing unit and the object and the line determined by the center of the second image sensing unit and the object to obtain a better scanning resolution corresponding to the object. In addition, because the first image sensing unit and the second image sensing unit can be swung or the baseline between the first image sensing unit and the second image sensing unit is varied with the corresponding distance between the attachable three-dimensional scan module and the object, compared to the prior art, the size of the object can be less restricted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
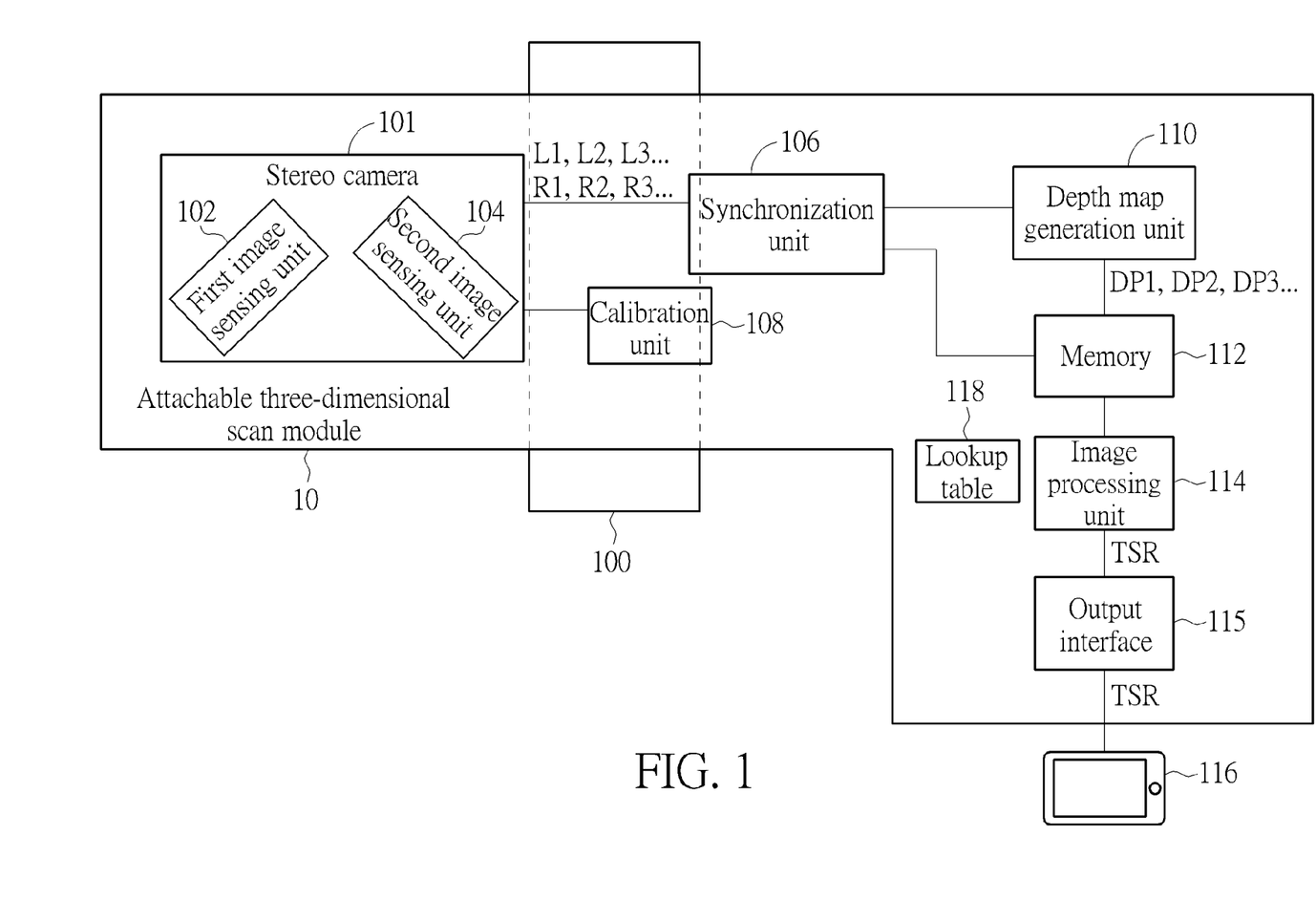
FIG. 1 is a diagram illustrating an attachable three-dimensional scan module according to a first embodiment of the present invention.
Figure 2A:
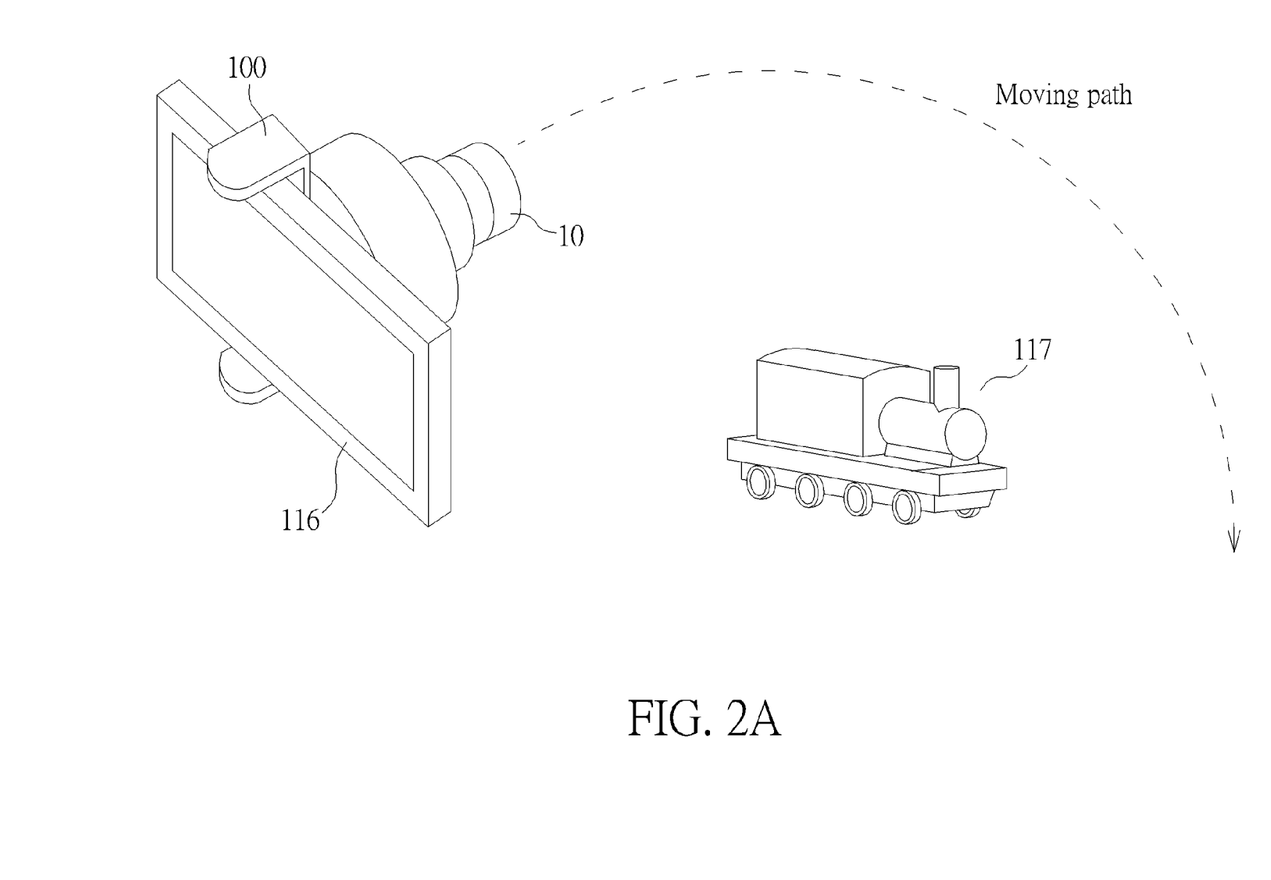
FIG. 2A and FIG. 2B are diagrams illustrating the attachable three-dimensional scan module being moved around the object.
Figure 2B:
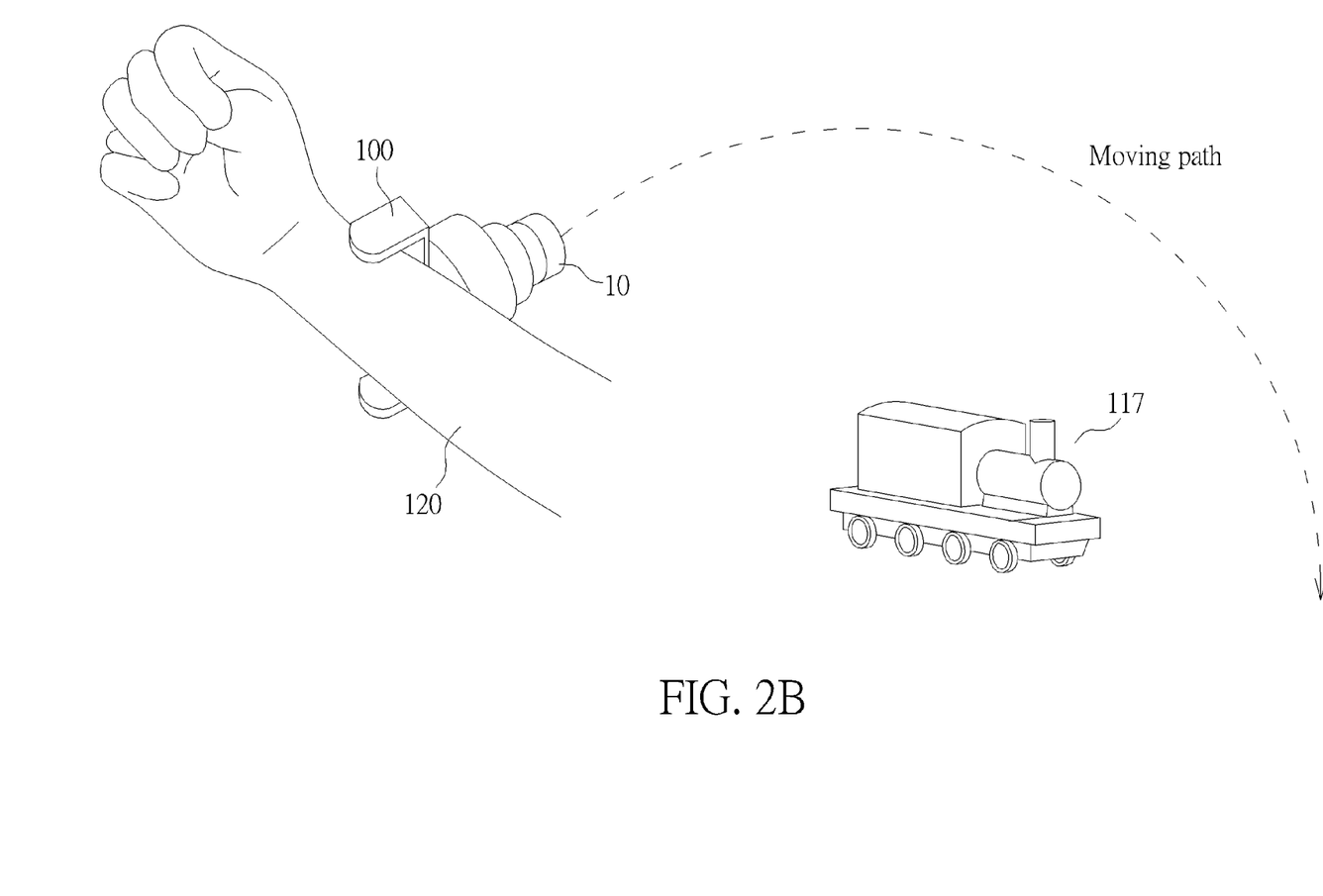

Please refer to FIG. 1. FIG. 1 is a diagram illustrating an attachable three-dimensional scan module 10 according to a first embodiment of the present invention. As shown in FIG. 1, the attachable three-dimensional scan module 10 includes an attachable unit 100, a first image sensing unit 102, a second image sensing unit 104, a synchronization unit 106, a calibration unit 108, a depth map generation unit 110, a memory 112, an image processing unit 114, and an output interface 115, wherein the first image sensing unit 102 and the second image sensing unit 104 can be optionally included in a stereo camera 101. In addition, the present invention is not limited to the attachable three-dimensional scan module 10 only including the first image sensing unit 102 and the second image sensing unit 104. That is to say, the attachable three-dimensional scan module 10 can include at least two image sensing units. As shown in FIG. 2A, the attachable unit 100 is used for fixing the attachable three-dimensional scan module 10 to a mobile device 116 (e.g. a mobile phone), wherein a size of the attachable three-dimensional scan module 10 is less than a size of the mobile device 116 (e.g. a cross-section of the attachable three-dimensional scan module 10 is less than a cross-section of the mobile device 116, or volume of the attachable three-dimensional scan module 10 is less than volume of the mobile device 116, or length of the attachable three-dimensional scan module 10 is less than length of the mobile device 116). When the mobile device 116 is moved around an object 117 (as shown in FIG. 2A), the first image sensing unit 102 captures a plurality of first images L1, L2, L3, . . . including the object 117, and the second image sensing unit 104 captures a plurality of second images R1, R2, R3, . . . including the object 117, wherein each first image (e.g. the first image L1) of the plurality of first images L1, L2, L3, . . . corresponds to a second image (e.g. the second image R1) of the plurality of second images R1, R2, R3, . . . , the attachable three-dimensional scan module 10 is not limited to a profile shown in FIG. 2A, the plurality of first images L1, L2, L3, . . . and the plurality of second images R1, R2, R3, . . . are RGB images or YUV images, and the plurality of first images L1, L2, L3, . . . are left eye images and the plurality of second images R1, R2, R3, . . . are right eye images. But, the present invention is not limited to the plurality of first images L1, L2, L3, . . . and the plurality of second images R1, R2, R3, . . . being RGB images or YUV images. That is to say, the plurality of first images L1, L2, L3, . . . and the plurality of second images R1, R2, R3, . . . can be another color space images. As shown in FIG. 1, the synchronization unit 106 is coupled between the first image sensing unit 102, the second image sensing unit 104, and the depth map generation unit 110 for outputting a first synchronization signal to each first image (e.g. the first image L1) of the plurality of first images L1, L2, L3, . . . and a corresponding second synchronization signal to a corresponding second image (e.g. the second image R1) of the plurality of second images R1, R2, R3, . . . , wherein a frequency of the first synchronization signal outputted by the synchronization unit 106 to each first image (e.g. the first image L1) of the plurality of first images L1, L2, L3, . . . and a frequency of the corresponding second synchronization signal outputted by the synchronization unit 106 to a corresponding second image (e.g. the second image R1) of the plurality of second images R1, R2, R3, . . . can be varied with a resolution of the first image L1 and a resolution of the second image R1, respectively, and the first synchronization signal and the corresponding second synchronization signal are the same or different. In addition, in the attachable three-dimensional scan module 10, each first image corresponds to a first synchronization signal. But, in another embodiment of the present invention, the first image L1 and the second image R1 can be divided into a plurality of image blocks according to scan lines of the first image sensing unit 102, respectively, wherein the synchronization unit 106 can output a synchronization signal to each image block of the plurality of image blocks of the first image L1, and the synchronization unit 106 can also output a corresponding synchronization signal to a corresponding image block of the plurality of image blocks of the second image R1. Further, in another embodiment of the present invention, the attachable three-dimensional scan module 10 further includes a register, and the register is used for storing an image block of the first image L1 corresponding to each scan line of the first image sensing unit 102 and a corresponding image block of the second image R1, wherein after the register completely stores image blocks of the first image L1 corresponding to scan lines of the first image sensing unit 102 and corresponding image blocks of the second image R1, the register outputs the first image L1 and the second image R1 according to a system clock of the attachable three-dimensional scan module 10, and when the attachable three-dimensional scan module 10 has the register, the synchronization unit 106 can be neglected. The calibration unit 108 is coupled to the first image sensing unit 102 and the second image sensing unit 104, before the first image sensing unit 102 outputs each first image (e.g. the first image L1) of the plurality of first images L1, L2, L3, . . . and the second image sensing unit 104 outputs a corresponding second image (e.g. the second image R1) of the plurality of second images R1, R2, R3, . . . , the calibration unit 108 executes calibration processing on the first image L1 and the second image R1, wherein the calibration processing includes at least one of a color space calibration and an assembly calibration. But, in another embodiment of the present invention, the synchronization unit 106 and the calibration unit 108 can be integrated into the stereo camera 101, that is, the stereo camera 101 (including the synchronization unit 106 and the calibration unit 108) can directly generate and output the plurality of first images L1, L2, L3, . . . and the plurality of second images R1, R2, R3, . . . to the depth map generation unit 110, wherein the calibration processing has been executed on the plurality of first images L1, L2, L3, . . . and the plurality of second images R1, R2, R3, . . . . Further, in another embodiment of the present invention, after the first image sensing unit 102 outputs each first image (e.g. the first image L1) of the plurality of first images L1, L2, L3, . . . and the second image sensing unit 104 outputs a corresponding second image (e.g. the second image R1) of the plurality of second images R1, R2, R3, . . . , the calibration unit 108 executes the calibration processing on the first image L1 and the second image R1. As shown in FIG. 1, after the depth map generation unit 110 receives the plurality of first images L1, L2, L3, . . . and the plurality of second images R1, R2, R3, . . . , the depth map generation unit 110 can process the first image L1 and the second image R1 together to generate a corresponding depth map DP1 according to the first synchronization signal and the second synchronization signal. That is to say, the depth map generation unit 110 can generate the depth map DP1 according to each scan line of the first image L1 and a corresponding scan line of the second image R1 in turn. Thus, the depth map generation unit 110 can generate a plurality of depth maps DP1, DP2, DP3, . . . according to the plurality of first images L1, L2, L3, . . . and the plurality of second images R1, R2, R3, . . . . As shown in FIG. 2A, because the mobile device 116 is moved around the object 117 to scan the object 117, the plurality of depth maps DP1, DP2, DP3, . . . can correspond to different view angles. As shown in FIG. 1, the memory 112 is coupled to the synchronization unit 106 and the depth map generation unit 110 for storing the plurality of first images L1, L2, L3, . . . , the plurality of second images R1, R2, R3, . . . , and the plurality of depth maps DP1, DP2, DP3, . . . . However, if the synchronization unit 106 and the calibration unit 108 are integrated into the stereo camera 101, the memory 112 is coupled to the stereo camera 101 and the depth map generation unit 110 for storing the plurality of first images L1, L2, L3, . . . , the plurality of second images R1, R2, R3, . . . , and the plurality of depth maps DP1, DP2, DP3, . . . . As shown in FIG. 1, the image processing unit 114 is coupled to the memory 112 for generating and outputting a color three-dimensional scan result TSR corresponding to the object 117 according to the plurality of first images L1, L2, L3, . . . , the plurality of second images R1, R2, R3, . . . , and the plurality of depth maps DP1, DP2, DP3, . . . . But, in another embodiment of the present invention, the image processing unit 114 real time generates and outputs a part of the color three-dimensional scan result TSR corresponding to the object 117 according to each first image (e.g. the first image L1) of the plurality of first images L1, L2, L3, . . . , a corresponding second image (e.g. the second image R1) of the plurality of second images R1, R2, R3, . . . , and a corresponding depth map (e.g. the depth map DP1) of the plurality of depth maps DP1, DP2, DP3, . . . . Meanwhile, the memory 112 of the attachable three-dimensional scan module 10 is not necessary. Further, in another embodiment of the present invention, the memory 112 is integrated into the image processing unit 114. Further, in another embodiment of the present invention, the synchronization unit 106 and the depth map generation unit 110 are integrated into a monolithic chip. In addition, in another embodiment of the present invention, the synchronization unit 106, the depth map generation unit 110, and the image processing unit 114 are integrated into a monolithic chip. As shown in FIG. 1, when the attachable three-dimensional scan module 10 is attached to the mobile device 116, the output interface 115 is used for outputting the color three-dimensional scan result TSR to the mobile device 116, wherein the output interface 115 is a mobile-industry-processor-interface (MIPI) or a universal serial bus (USB). Further, in another embodiment of the present invention, the output interface 115 is a wireless communication interface of a Wireless Fidelity (WiFi), a wireless LAN (WLAN), a Zigbee (IEEE 802.15.4), a Bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+ (Ant+). In addition, when the attachable three-dimensional scan module 10 does not include the memory 112, a memory included in the mobile device 116 can store the color three-dimensional scan result TSR generated by the image processing unit 114. As shown in FIG. 2A, although the attachable unit 100 fixes the attachable three-dimensional scan module 10 on the mobile device 116, the attachable unit 100 is also used for fixing the attachable three-dimensional scan module 10 on a body of a user (as shown in FIG. 2B). For example, when the attachable unit 100 fixes the attachable three-dimensional scan module 10 on an arm 120 of the user 120 (wherein the size of the attachable three-dimensional scan module 10 is less than a size of the arm 120 of the user), the user can swing the arm 120 of the user attached by the attachable three-dimensional scan module 10 around the object 117 to let the attachable three-dimensional scan module 10 generate the color three-dimensional scan result TSR. Meanwhile, the output interface 115 can output the color three-dimensional scan result TSR, or the plurality of first images L1, L2, L3, . . . , the plurality of second images R1, R2, R3, . . . , and the plurality of depth maps DP1, DP2, DP3, . . . to an external operation apparatus.

Figure 3:
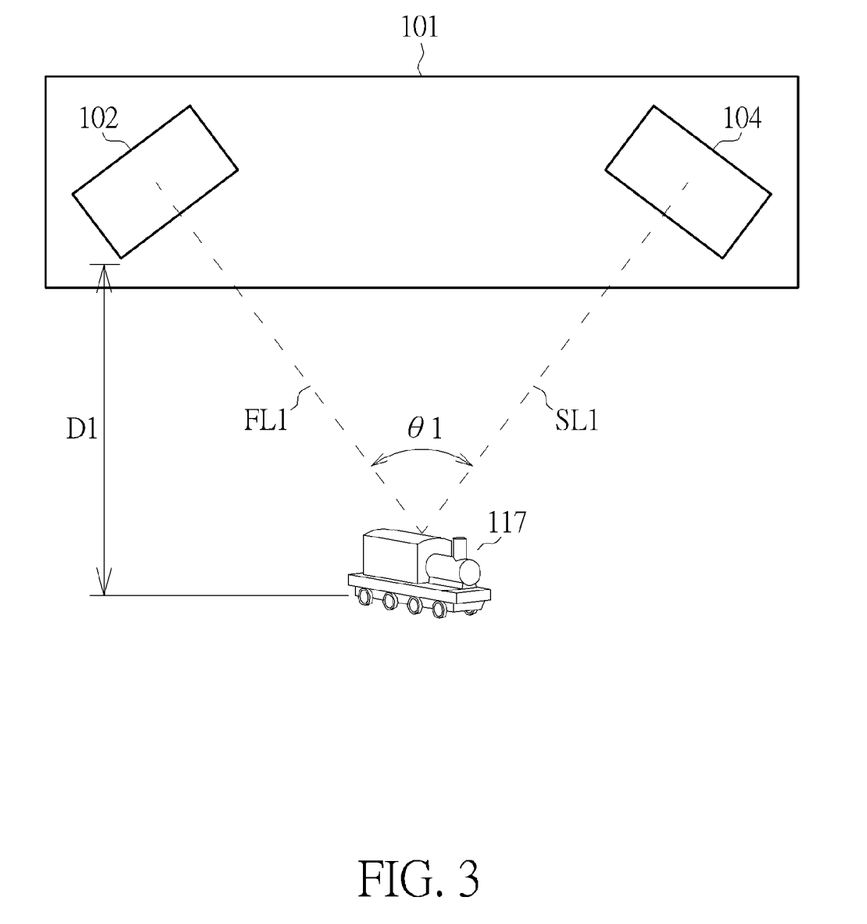
FIG. 3 is a diagram illustrating a corresponding distance between the first image sensing unit of the attachable three-dimensional scan module and the object when the first image sensing unit captures the first image.
Figure 4:
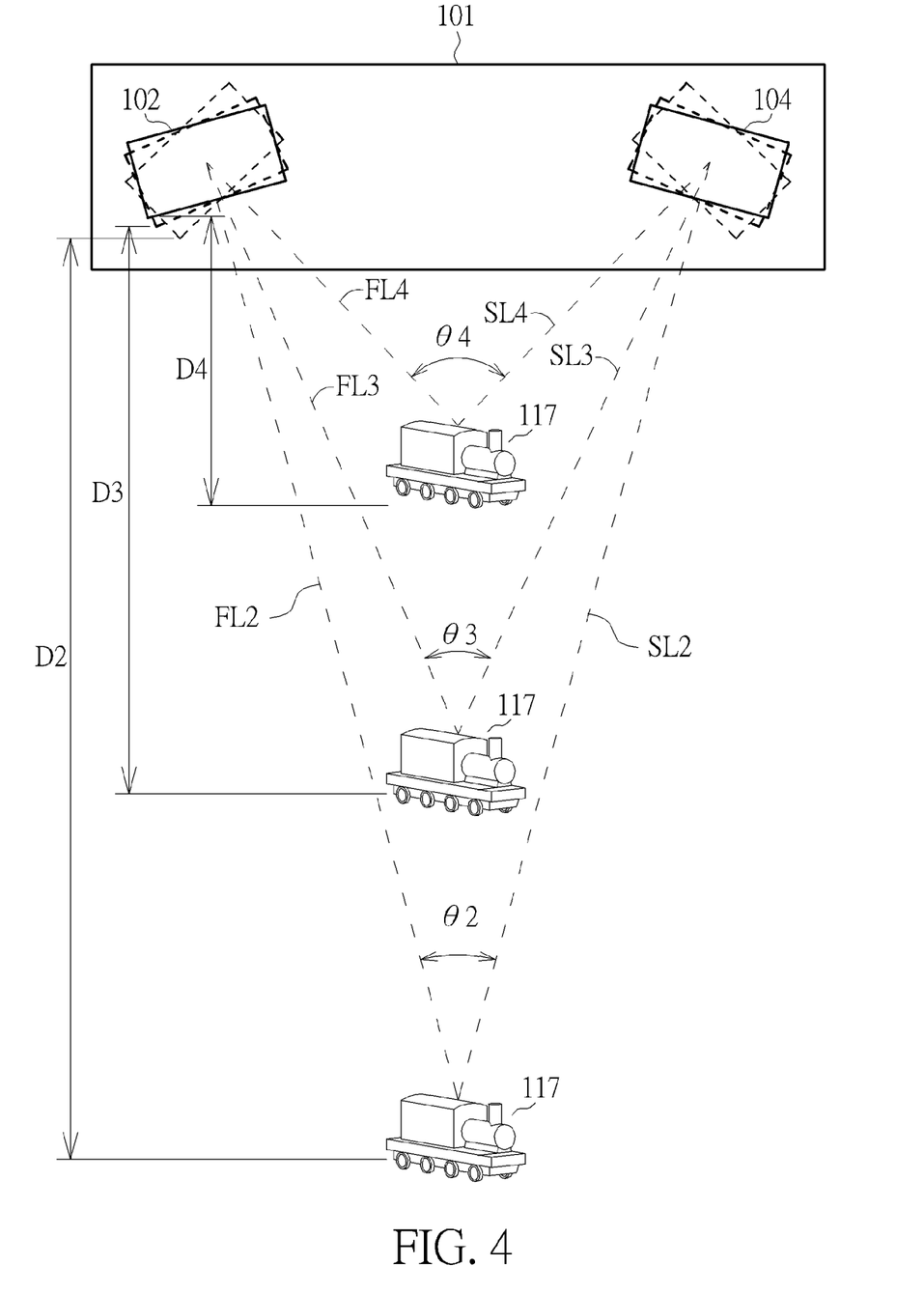
FIG. 4 is a diagram illustrating the first image sensing unit and the second image sensing unit being swung to let the object be always located at the intersection of the line determined by the center of the first image sensing unit and the object and the line determined by the center of the second image sensing unit and the object when the corresponding distance between the first image sensing unit and the object is varied with motion or rotation of the object.

Please refer to FIG. 3. FIG. 3 is a diagram illustrating a corresponding distance D1 between the first image sensing unit 102 of the attachable three-dimensional scan module 10 and the object 117 when the first image sensing unit 102 captures the first image L1, wherein the corresponding distance D1 corresponds to the depth map DP1, and the corresponding distance D1 is varied with time. As shown in FIG. 3, when the first image sensing unit 102 captures the first image L1, the corresponding distance D1 exists between the first image sensing unit 102 of the attachable three-dimensional scan module 10 and the object 117, a corresponding angle θ1 exists between a line FL1 determined by a center of the first image sensing unit 102 and the object 117 and a line SL1 determined by a center of the second image sensing unit 104 and the object 117, and the object 117 is located at an intersection of the line FL1 and the line SL1. In addition, because when the mobile device 116 scans the object 117, the object 117 can be moved or rotated arbitrarily, a corresponding distance between the first image sensing unit 102 of the attachable three-dimensional scan module 10 and the object 117 can be varied with motion or rotation of the object 117. That is to say, when a corresponding distance between the first image sensing unit 102 of the attachable three-dimensional scan module 10 and the object 117 is varied with motion or rotation of the object 117, the first image sensing unit 102 and the second image sensing unit 104 can be swung to make the object 117 be always located at an intersection of a line determined by the center of the first image sensing unit 102 and the object 117 and a line determined by the center of the second image sensing unit 104 and the object 117 (As shown in FIG. 4). As shown in FIG. 4, when a corresponding distance D2 exists between the first image sensing unit 102 of the attachable three-dimensional scan module 10 and the object 117, a corresponding angle θ2 exists between a line FL2 determined by the center of the first image sensing unit 102 and the object 117 and a line SL2 determined by the center of the second image sensing unit 104 and the object 117, wherein the corresponding distance D2 corresponds to the depth map DP2; when a corresponding distance D3 exists between the first image sensing unit 102 of the attachable three-dimensional scan module 10 and the object 117, a corresponding angle θ3 exists between a line FL3 determined by the center of the first image sensing unit 102 and the object 117 and a line SL3 determined by the center of the second image sensing unit 104 and the object 117, wherein the corresponding distance D3 corresponds to the depth map DP3; and when a corresponding distance D4 exists between the first image sensing unit 102 of the attachable three-dimensional scan module 10 and the object 117, a corresponding angle θ4 exists between a line FL4 determined by the center of the first image sensing unit 102 and the object 117 and a line SL4 determined by the center of the second image sensing unit 104 and the object 117, wherein the corresponding distance D4 corresponds to a depth map DP4. As shown in FIG. 4, because the first image sensing unit 102 and the second image sensing unit 104 can be swung, no matter how the object 117 is mover or rotated, the attachable three-dimensional scan module 10 can always make the object 117 be located at an intersection of a line determined by the center of the first image sensing unit 102 and the object 117 and a line determined by the center of the second image sensing unit 104 and the object 117. In addition, because the first image sensing unit 102 and the second image sensing unit 104 can be swung, compared to the prior art, a size of the object 117 can be less restricted. In addition, the attachable three-dimensional scan module 10 further includes a lookup table 118, wherein the lookup table 118 is used for storing relationships between corresponding distances (e.g. the corresponding distances D1, D2, D3, . . . ) between the first image sensing unit 102 of the attachable three-dimensional scan module 10 and the object 117, corresponding angles (e.g. the corresponding angle θ1, θ2, θ3, . . . ) determined by a line determined by the center of the first image sensing unit 102 and the object 117 and a line determined by the center of the second image sensing unit 104 and the object 117, and depth maps (e.g. the depth maps DP1, DP2, DP3, . . . ).

Figure 5:
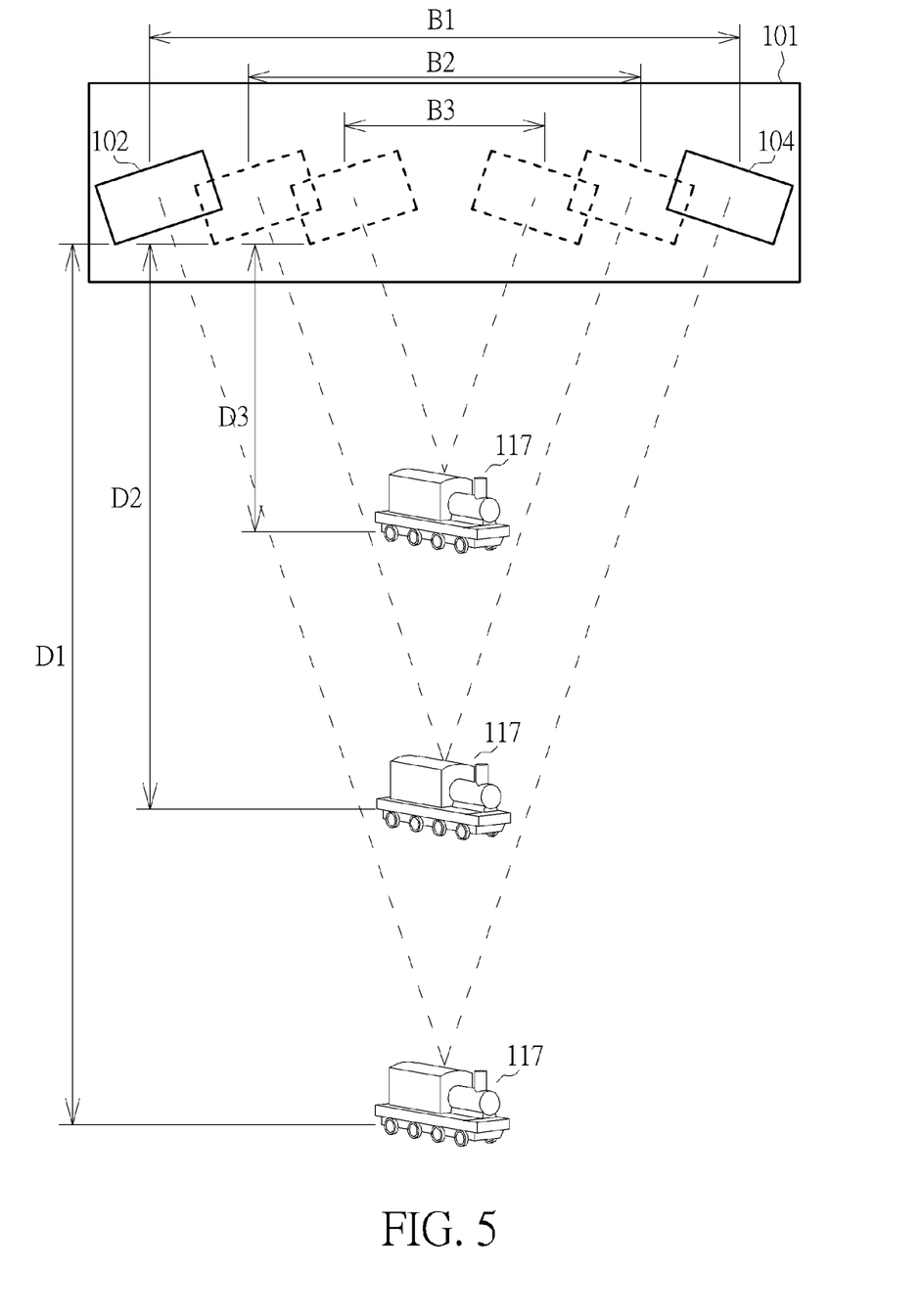
FIG. 5 is a diagram illustrating a baseline between the first image sensing unit and the second image sensing unit being varied with a corresponding distance between the first image sensing unit and the object according to another embodiment.

Please refer to FIG. 5. FIG. 5 is a diagram illustrating a baseline between the first image sensing unit 102 and the second image sensing unit 104 being varied with a corresponding distance between the first image sensing unit 102 and the object 117 according to another embodiment. As shown in FIG. 5, when the corresponding distance D1 exists between the first image sensing unit 102 of the attachable three-dimensional scan module 10 and the object 117, a baseline B1 exists between the first image sensing unit 102 and the second image sensing unit 104; when the corresponding distance D2 exists between the first image sensing unit 102 of the attachable three-dimensional scan module 10 and the object 117, a baseline B2 exists between the first image sensing unit 102 and the second image sensing unit 104; and when the corresponding distance D3 exists between the first image sensing unit 102 of the attachable three-dimensional scan module 10 and the object 117, a baseline B3 exists between the first image sensing unit 102 and the second image sensing unit 104. As shown in FIG. 5, because a baseline existing between the first image sensing unit 102 and the second image sensing unit 104 can be varied with a corresponding distance between the first image sensing unit 102 of the attachable three-dimensional scan module 10 and the object 117, no matter how the object 117 is mover or rotated, the attachable three-dimensional scan module 10 can always make the object 117 be located at an intersection of a line determined by the center of the first image sensing unit 102 and the object 117 and a line determined by the center of the second image sensing unit 104 and the object 117. In addition, because a baseline between the first image sensing unit 102 and the second image sensing unit 104 can be varied with a corresponding distance between the first image sensing unit 102 of the attachable three-dimensional scan module 10 and the object 117, compared to the prior art, the size of the object 117 can be less restricted. In addition, the lookup table 118 included in the attachable three-dimensional scan module 10 can be used for storing relationships between corresponding distances (e.g. the corresponding distances D1, D2, D3, . . . ) existing between the first image sensing unit 102 of the attachable three-dimensional scan module 10 and the object 117, baselines (e.g. the baselines B1, B2, B3, . . . ) existing between the first image sensing unit 102 and the second image sensing unit 104, and depth maps (e.g. the depth maps DP1, DP2, DP3, . . . ).

In addition, in another embodiment of the present invention, a baseline between the first image sensing unit 102 and the second image sensing unit 104 can be varied with a corresponding distance between the first image sensing unit 102 of the attachable three-dimensional scan module 10 and the object 117, and the first image sensing unit 102 and the second image sensing unit 104 can also be swung with a corresponding distance between the first image sensing unit 102 of the attachable three-dimensional scan module 100 and the object 117. Therefore, the lookup table 118 included in the attachable three-dimensional scan module 10 can be used for storing relationships between corresponding distances (e.g. the corresponding distances D1, D2, D3, . . . ) existing between the first image sensing unit 102 of the attachable three-dimensional scan module 100 and the object 117, corresponding angles (e.g. the corresponding angles θ1, θ2, θ3, . . . ) determined by a line determined by the center of the first image sensing unit 102 and the object 117 and a line determined by the center of the second image sensing unit 104 and the object 117, baselines (e.g. the baselines B1, B2, B3, . . . ) existing between the first image sensing unit 102 and the second image sensing unit 104, and depth maps (e.g. the depth maps DP1, DP2, DP3, . . . ).

Figure 6:
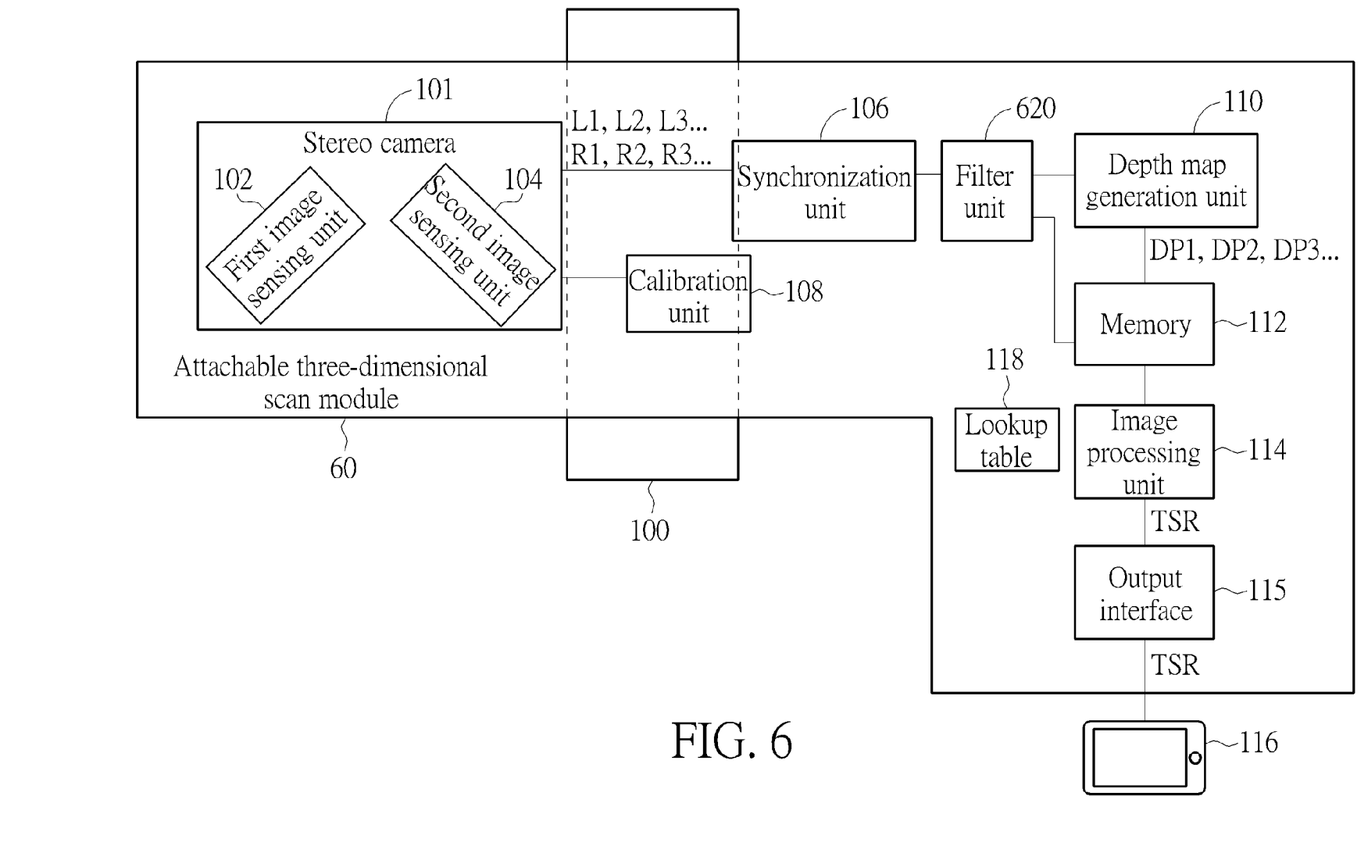
FIG. 6 is a diagram illustrating an attachable three-dimensional scan module according to a second embodiment of the present invention.

Please refer to FIG. 6. FIG. 6 is a diagram illustrating an attachable three-dimensional scan module 60 according to a second embodiment of the present invention. As shown in FIG. 6, a difference between the attachable three-dimensional scan module 60 and the attachable three-dimensional scan module 10 is that the attachable three-dimensional scan module 60 further includes a filter unit 620, wherein the filter unit 620 is coupled between the first image sensing unit 102 and the second image sensing unit 104 of the stereo camera 101, the depth map generation unit 110, and the memory 112. The filter unit 620 is used for converting the plurality of first images L1, L2, L3, . . . captured by the first image sensing unit 102 and the plurality of second images R1, R2, R3, . . . captured by the second image sensing unit 104 into monochrome images. Therefore, the depth map generation unit 110 can generate the plurality of depth maps DP1, DP2, DP3, . . . according to the plurality of monochrome first images L1, L2, L3, . . . and the plurality of monochrome second images R1, R2, R3, . . . . Further, subsequent operational principles of the attachable three-dimensional scan module 60 are the same as those of the attachable three-dimensional scan module 10, so further description thereof is omitted for simplicity.

Figure 7:
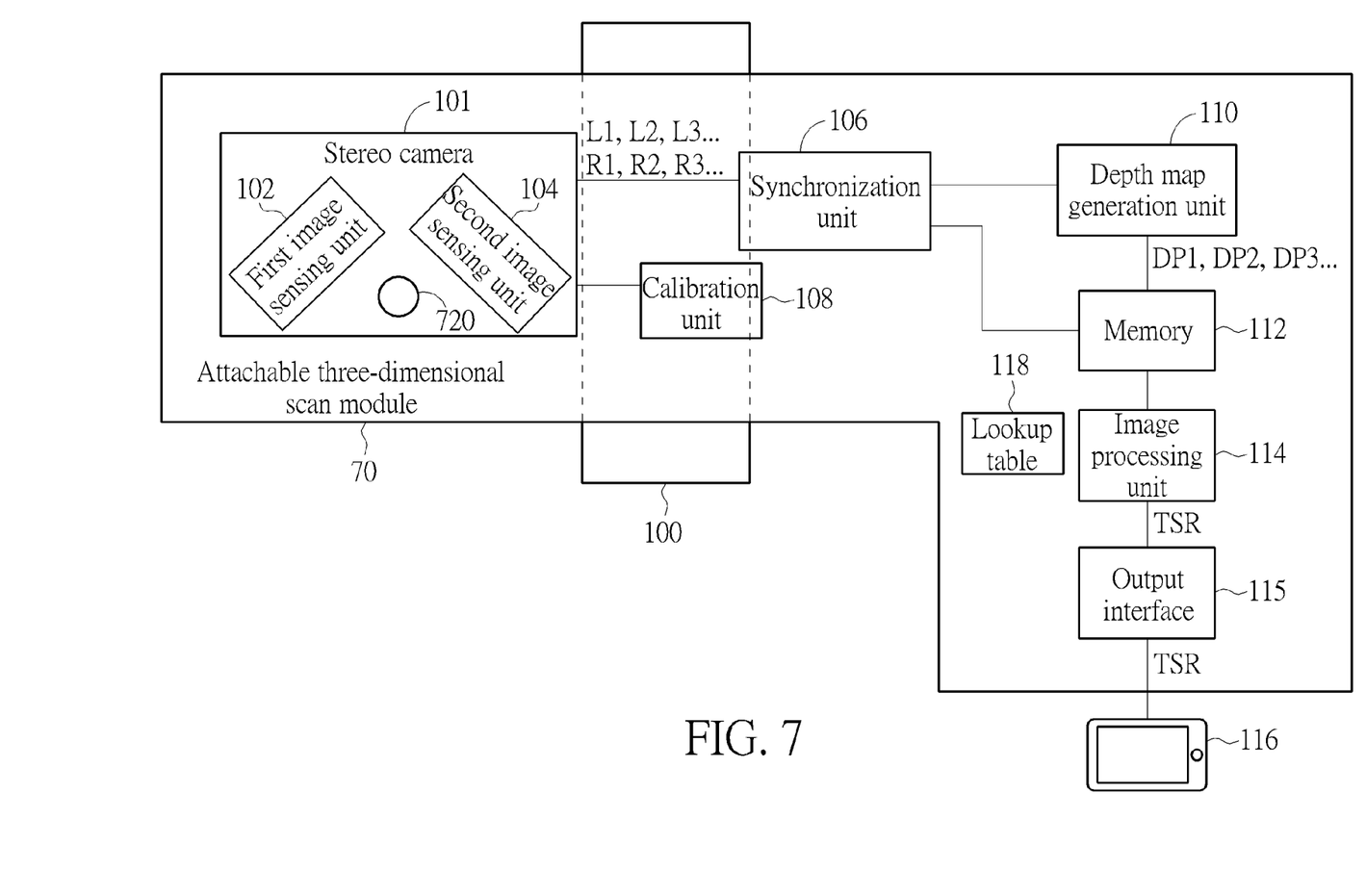
FIG. 7 is a diagram illustrating an attachable three-dimensional scan module according to a third embodiment of the present invention.
Figure 8:
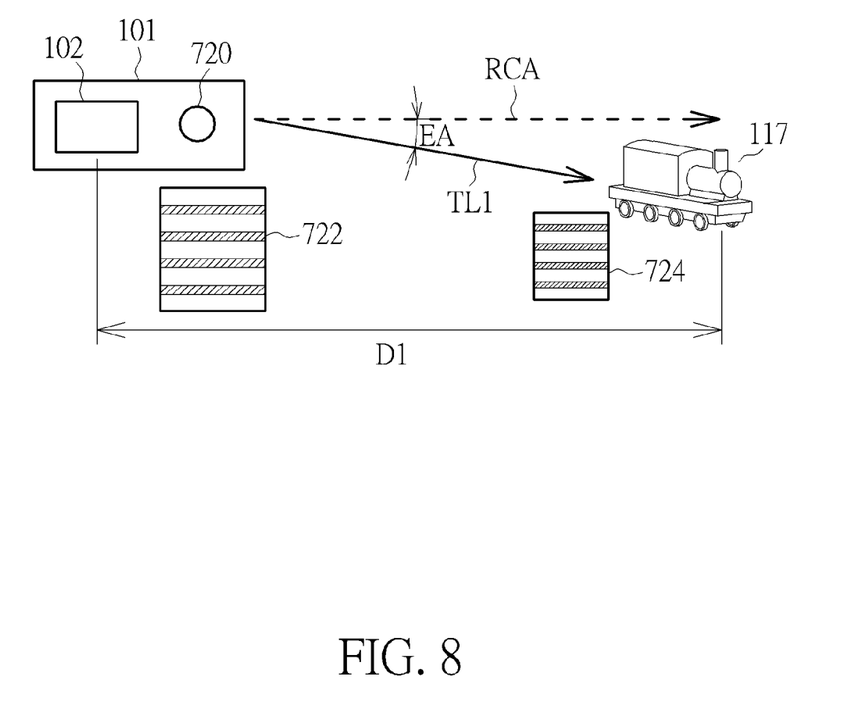
FIG. 8 is a diagram illustrating relationships between an emitting angle of a light source, the corresponding distance between the first image sensing unit of the attachable three-dimensional scan module and the object, and a ratio of a size of a predetermined light pattern formed on a surface of the object to a size of a predetermined light pattern emitted by the light source.

Please refer to FIG. 7 and FIG. 8. FIG. 7 is a diagram illustrating an attachable three-dimensional scan module 70 according to a third embodiment of the present invention, and FIG. 8 is a diagram illustrating relationships between an emitting angle of a light source 720, the corresponding distance D1 between the first image sensing unit 102 of the attachable three-dimensional scan module 70 and the object 117, and a ratio RA of a size of a predetermined light pattern 724 formed on a surface of the object 117 to a size of a predetermined light pattern 722 emitted by the light source 720. As shown in FIG. 7, a difference between the attachable three-dimensional scan module 70 and the attachable three-dimensional scan module 10 is that the attachable three-dimensional scan module 70 further includes a light source 720, wherein the light source 720 can have different emitting angles. When the light source 720 emits the predetermined light pattern 722 (e.g. a strip pattern) to the object 117, the first image sensing unit 102 captures the plurality of first images L1, L2, L3, . . . including the object 117, and the second image sensing unit 104 captures the plurality of second images R1, R2, R3, . . . including the object 117. But, the present invention is not limited to the predetermined light pattern 722 being a strip pattern. As shown in FIG. 8, an emitting angle EA of the light source 720 is determined by a line TL1 determined by the light source 720 and the object 117 and a reference coordinate axis RCA, and when the corresponding distance D1 exists between the first image sensing unit 102 of the attachable three-dimensional scan module 10 and the object 117 (the second image sensing unit 104 of the stereo camera 101 is not shown in FIG. 8), the ratio RA can be determined by the size of the predetermined light pattern 724 formed on the surface of the object 117 and the size of the predetermined light pattern 722 emitted by the light source 720, wherein the ratio RA corresponds the corresponding distance D1 and the emitting angle EA.

Figure 9:
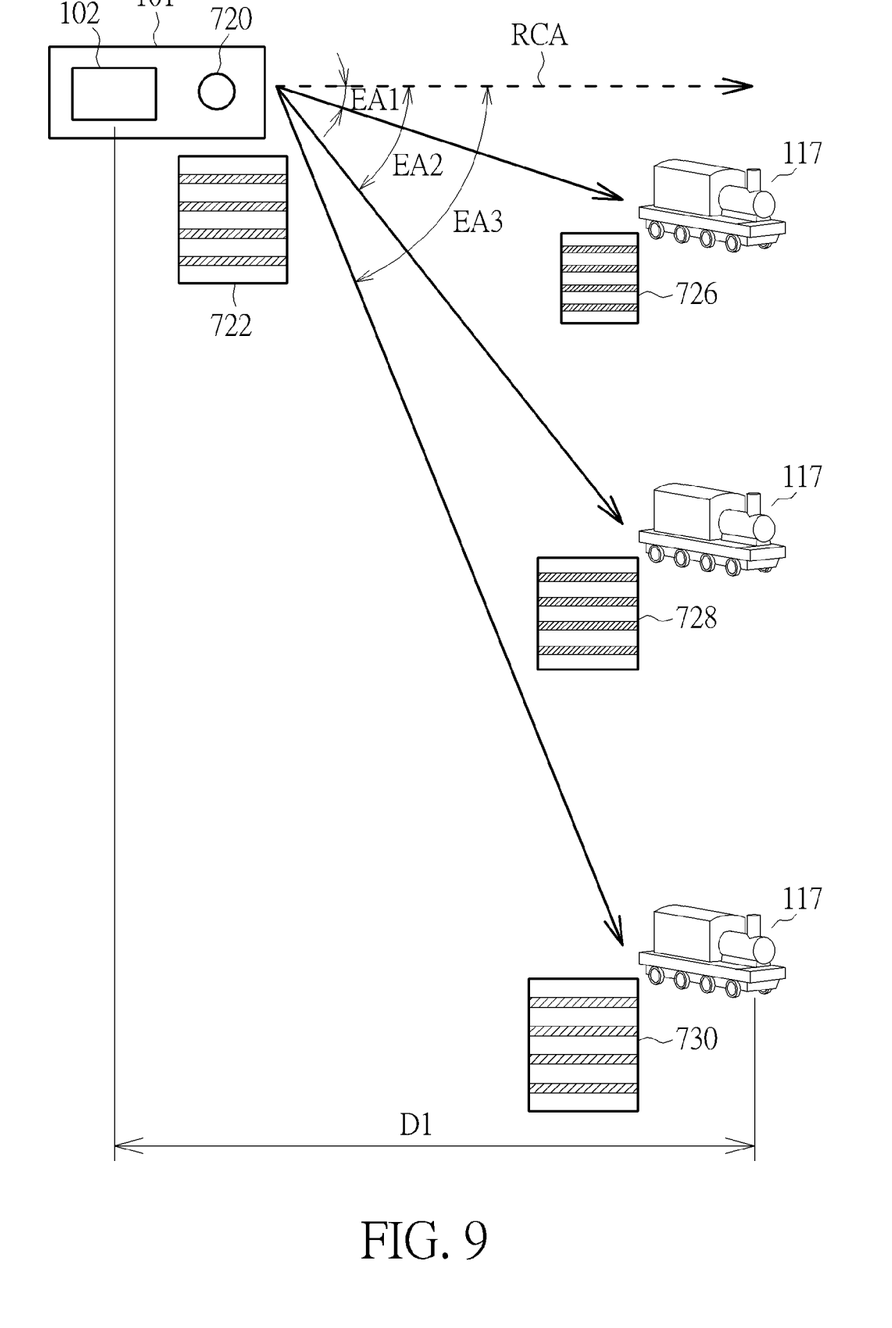
FIG. 9 is a diagram illustrating ratios determined by predetermined light patterns formed on the surface of the object and the size of the predetermined light pattern emitted by the light source being varied with different emitting angles of the light source when the corresponding distance exists between the first image sensing unit of the attachable three-dimensional scan module and the object and the light source has the different emitting angles.
Figure 10:
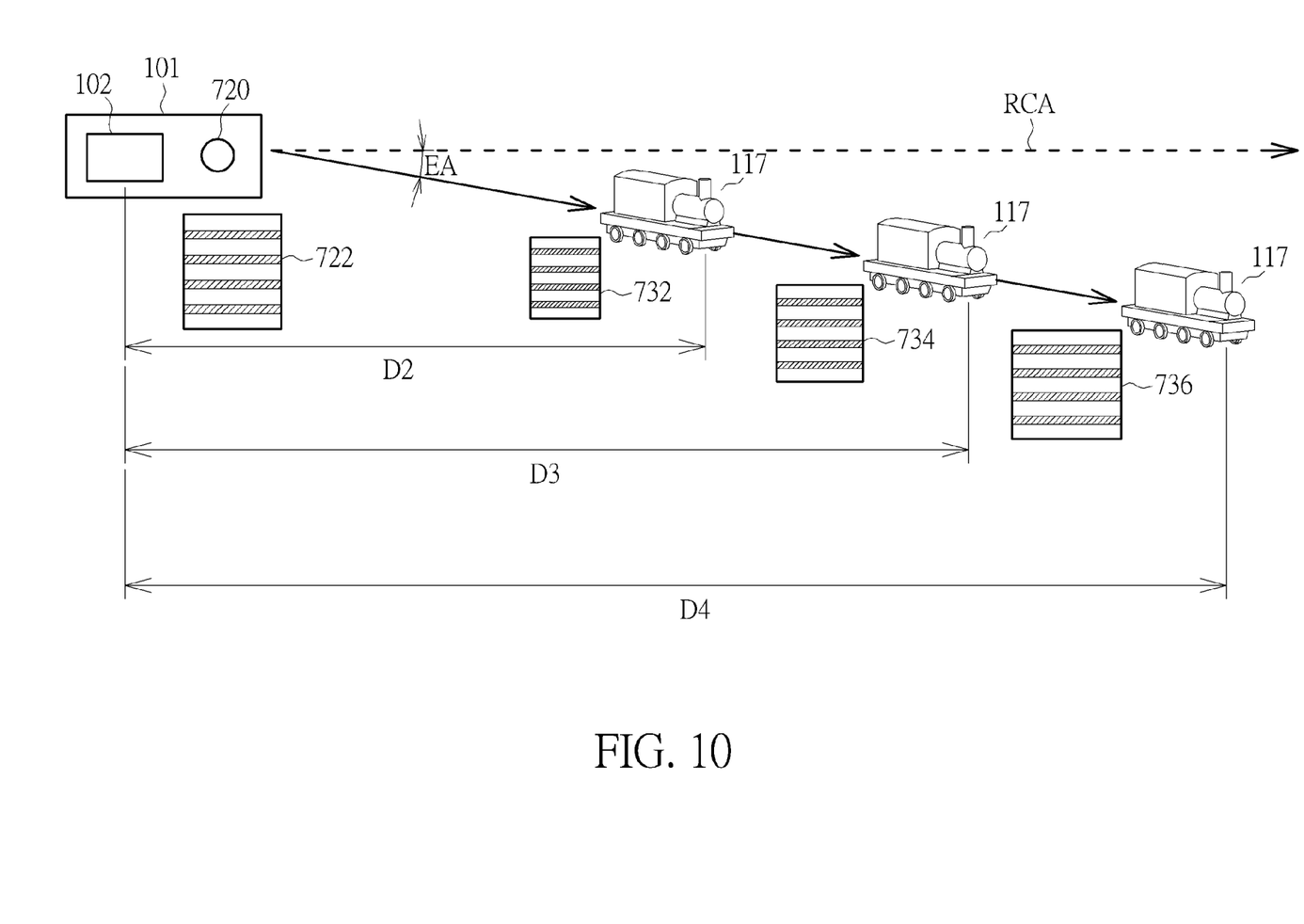
FIG. 10 is a diagram illustrating ratios determined by predetermined light patterns formed on the surface of the object and the size of the predetermined light pattern emitted by the light source being varied with different corresponding distances between the first image sensing unit of the attachable three-dimensional scan module and the object when different corresponding distances exist between the first image sensing unit of the attachable three-dimensional scan module and the object, and the light source has the emitting angle.

Please refer to FIG. 9 and FIG. 10. FIG. 9 is a diagram illustrating ratios determined by predetermined light patterns formed on the surface of the object 117 and the size of the predetermined light pattern 722 emitted by the light source 720 being varied with different emitting angles of the light source 720 when the corresponding distance D1 exists between the first image sensing unit 102 of the attachable three-dimensional scan module 70 and the object 117 and the light source 720 has the different emitting angles, and FIG. 10 is a diagram illustrating ratios determined by predetermined light patterns formed on the surface of the object 117 and the size of the predetermined light pattern 722 emitted by the light source 720 being varied with different corresponding distances between the first image sensing unit 102 of the attachable three-dimensional scan module 70 and the object 117 when different corresponding distances exist between the first image sensing unit 102 of the attachable three-dimensional scan module 70 and the object 117, and the light source 720 has the emitting angle EA. As shown in FIG. 9, when the corresponding distance D1 exists between the first image sensing unit 102 of the attachable three-dimensional scan module 70 and the object 117 and the light source 720 has an emitting angle EA1 (the second image sensing unit 104 of the stereo camera 101 is not shown in FIG. 9), a ratio RA1 can be determined by a size of a predetermined light pattern 726 formed on the surface of the object 117 and the size of the predetermined light pattern 722 emitted by the light source 720; when the corresponding distance D1 exists between the first image sensing unit 102 of the attachable three-dimensional scan module 70 and the object 117 and the light source 720 has an emitting angle EA 2, a ratio RA2 can be determined by a size of a predetermined light pattern 728 formed on the surface of the object 117 and the size of the predetermined light pattern 722 emitted by the light source 720; and when the corresponding distance D1 exists between the first image sensing unit 102 of the attachable three-dimensional scan module 70 and the object 117 and the light source 720 has an emitting angle EA3, a ratio RA3 can be determined by a size of a predetermined light pattern 730 formed on the surface of the object 117 and the size of the predetermined light pattern 722 emitted by the light source 720, wherein the ratio RA1, the ratio RA2, and the ratio RA3 are different each other. As shown in FIG. 10, when the light source 720 has the emitting angle EA and the corresponding distance D2 exists between the first image sensing unit 102 of the attachable three-dimensional scan module 70 and the object 117 (the second image sensing unit 104 of the stereo camera 101 is not shown in FIG. 10), a ratio RA4 can be determined by a size of a predetermined light pattern 732 formed on the surface of the object 117 and the size of the predetermined light pattern 722 emitted by the light source 720; when the light source 720 has the emitting angle EA and the corresponding distance D3 exists between the first image sensing unit 102 of the attachable three-dimensional scan module 70 and the object 117, a ratio RA5 can be determined by a size of a predetermined light pattern 734 formed on the surface of the object 117 and the size of the predetermined light pattern 722 emitted by the light source 720; and when the light source 720 has the emitting angle EA and the corresponding distance D4 exists between the first image sensing unit 102 of the attachable three-dimensional scan module 70 and the object 117, a ratio RA6 can be determined by a size of a predetermined light pattern 736 formed on the surface of the object 117 and the size of the predetermined light pattern 722 emitted by the light source 720, wherein the ratio RA4, the ratio RA5, and the ratio RA6 are different each other. Therefore, the lookup table 118 included in the attachable three-dimensional scan module 70 is used for storing relationships between corresponding distances (e.g. the corresponding distance D1, D2, D3, . . . ) between the first image sensing unit 102 of the attachable three-dimensional scan module 70 and the object 117, emitting angles (e.g. the emitting angles EA, EA1, EA2, EA3, . . . ) of the light source 720, ratios (e.g. the ratios RA, RA1, RA2, RA3, . . . ) determined by sizes of predetermined light patterns (e.g. the predetermined light patterns 722, 724, 726, 728, . . . ) formed on the surface of the object 117 and the size of the predetermined light pattern 722 emitted by the light source 720, and depth maps (e.g. the depth maps DP1, DP2, DP3, . . . ). Further, subsequent operational principles of the attachable three-dimensional scan module 70 are the same as those of the attachable three-dimensional scan module 10, so further description thereof is omitted for simplicity.

In addition, in another embodiment of the present invention, the attachable three-dimensional scan modules 10, 60, 70 do not include the image processing unit 114, so the plurality of depth maps DP1, DP2, DP3, . . . generated by the depth map generation unit 110 according to the plurality of first images L1, L2, L3, . . . and the plurality of second images R1, R2, R3, . . . , and the plurality of first images L1, L2, L3, . . . and the plurality of second images R1, R2, R3, . . . are transmitted to the mobile device 116 through the output interface 115 (mobile-industry-processor-interface (MIPI) or a universal serial bus (USB)). After the mobile device 116 receives the plurality of first images L1, L2, L3, . . . , the plurality of second images R1, R2, R3, . . . , and the plurality of depth maps DP1, DP2, DP3, . . . , the mobile device 116 can generate the color three-dimensional scan result TSR according to plurality of first images L1, L2, L3, . . . , the plurality of second images R1, R2, R3, . . . , and the plurality of depth maps DP1, DP2, DP3, . . . .

To sum up, compared to the prior art, because the attachable three-dimensional scan module provided by the present invention has smaller profile and volume, the attachable three-dimensional scan module can be attached to arbitrary mobile device. In addition, when the first image sensing unit captures the plurality of first images including the object and the second image sensing unit captures the plurality of second images including the object, the first image sensing unit and the second image sensing unit can be swung to let the object be always located at an intersection of a line determined by the center of the first image sensing unit and the object and a line determined by the center of the second image sensing unit and the object, or make a baseline between the first image sensing unit and the second image sensing unit be varied with a corresponding distance between the first image sensing unit of the attachable three-dimensional scan module and the object to let the object be always located at the intersection of the line determined by the center of the first image sensing unit and the object and the line determined by the center of the second image sensing unit and the object, or make the first image sensing unit and the second image sensing unit be swung and the baseline between the first image sensing unit and the second image sensing unit be varied with the corresponding distance between the first image sensing unit of the attachable three-dimensional scan module and the object to let the object be always located at the intersection of the line determined by the center of the first image sensing unit and the object and the line determined by the center of the second image sensing unit and the object. Therefore, compared to the prior art, no matter how the object is mover or rotated, the attachable three-dimensional scan module provided by the present invention can always make the object be located at the intersection of the line determined by the center of the first image sensing unit and the object and the line determined by the center of the second image sensing unit and the object to obtain a better scanning resolution corresponding to the object. In addition, because the first image sensing unit and the second image sensing unit can be swung or the baseline between the first image sensing unit and the second image sensing unit is varied with the corresponding distance between the first image sensing unit of the attachable three-dimensional scan module and the object, compared to the prior art, the size of the object can be less restricted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An attachable three-dimensional scan module, comprising:
   an attachment device fixing the attachable three-dimensional scan module on a mobile device or a user, wherein a size of the attachable three-dimensional scan module is less than a size of the mobile device or a hand of the user;
   at least two image sensors, wherein when the attachable three-dimensional scan module is moved around an object, a first image sensor of the at least two image sensors captures a plurality of first images comprising the object, and a second image sensor of the at least two image sensors captures a plurality of second images comprising the object, wherein each first image of the plurality of first images corresponds to a second image of the plurality of second images, when the first image sensor generates the each first image, a corresponding distance exists between the attachable three-dimensional scan module and the object, wherein the plurality of first images or the plurality of second images are color images, and the corresponding distance is varied with time;
   a depth map generation unit generator coupled to the at least two image sensors for generating a corresponding depth map according to the each first image and the second image, wherein a plurality of depth maps generated by the depth map generation unit generator according to the plurality of first images and the plurality of second images, the plurality of first images, and the plurality of second images are used for generating a color three-dimensional scan result corresponding to the object; and
   an output circuit coupled to the depth map generator and the at least two image sensors for outputting the color three-dimensional scan result, or the plurality of first images, the plurality of second images, and the plurality of depth maps.

2. The attachable three-dimensional scan module of claim 1, wherein when the first image sensor captures the each first image, a corresponding angle exists between a first line determined by a center of the first image sensor and the object and a second line determined by a center of the second image sensor and the object, and the object is located at an intersection of the first line and the second line.

3. The attachable three-dimensional scan module of claim 2, further comprising:
   a lookup table storing relations between the corresponding distance, the corresponding angle, and the corresponding depth map.

4. The attachable three-dimensional scan module of claim 2, wherein when the first image sensor captures the each first image, a corresponding baseline exists between the first image sensor and the second image sensor.

5. The attachable three-dimensional scan module of claim 4, further comprising:
a lookup table storing relations between the corresponding distance, the corresponding angle, the corresponding baseline, and the corresponding depth map.

6. The attachable three-dimensional scan module of claim 1, wherein a corresponding baseline exists between the first image sensor and the second image sensor.

7. The attachable three-dimensional scan module of claim 6, further comprising:
a lookup table storing relations between the corresponding distance, the corresponding baseline, and the corresponding depth map.

8. The attachable three-dimensional scan module of claim 1, wherein the plurality of first images and the plurality of second images are RGB images or YUV images.

9. The attachable three-dimensional scan module of claim 1, further comprising:
a filter unit coupled between the first image sensor, the second image sensor, and the depth map generator for converting the plurality of first images and the plurality of second images into monochrome images.

10. The attachable three-dimensional scan module of claim 1, further comprising:
a synchronization unit coupled between the first image sensor, the second image sensor, and the depth map generator for outputting a first synchronization signal to the each first image and a corresponding second synchronization signal to the second image.

11. The attachable three-dimensional scan module of claim 10, wherein the first synchronization signal corresponds to an image block of a plurality of image blocks comprised in the each first image, and the corresponding second synchronization signal corresponds to a corresponding image block of a plurality of image blocks comprised in the second image.

12. The attachable three-dimensional scan module of claim 10, further comprising:
a memory coupled to the synchronization unit and the depth map generator for storing the plurality of first images, the plurality of second images, and the plurality of depth maps.

13. The attachable three-dimensional scan module of claim 12, further comprising:
an image processing unit coupled to the memory for generating the color three-dimensional scan result according to the plurality of first images, the plurality of second images, and the plurality of depth maps.

14. The attachable three-dimensional scan module of claim 1, further comprising:
a register storing an image block of the each first image corresponding to each scan line of the first image sensor and a corresponding image block of the second image, wherein after the register completely stores image blocks of the each first image corresponding to scan lines of the first image sensor and corresponding image blocks of the second image, the register outputs the each first image and the second image.

15. The attachable three-dimensional scan module of claim 1, further comprising:
a calibration unit coupled to the first image sensor and the second image sensor, wherein before the first image sensor outputs the each first image and the second image sensor outputs the second image, the calibration unit executes calibration processing on the each first image and the second image.

16. The attachable three-dimensional scan module of claim 15, wherein the calibration processing comprises at least one of a color space calibration and an assembly calibration.

17. The attachable three-dimensional scan module of claim 1, further comprising:
a memory coupled to the first image sensor, the second image sensor, and the depth map generator for storing the plurality of first images, the plurality of second images, and the plurality of depth maps.

18. The attachable three-dimensional scan module of claim 17, further comprising:
an image processing unit coupled to the memory for generating the color three-dimensional scan result according to the plurality of first images, the plurality of second images, and the plurality of depth maps.

19. The attachable three-dimensional scan module of claim 1, wherein when the plurality of first images, the plurality of second images, and the plurality of depth maps are transmitted to the mobile device through the output interface, the mobile device generates the color three-dimensional scan result according to the plurality of first images, the plurality of second images, and the plurality of depth maps.

20. The attachable three-dimensional scan module of claim 1, wherein the output circuit is a mobile-industry-processor-interface (MIPI) or a universal serial bus (USB).

21. The attachable three-dimensional scan module of claim 1, wherein the output circuit is a wireless communication interface of a Wireless Fidelity (WiFi), a wireless LAN (WLAN), a Zigbee (IEEE 802.15.4), a Bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+ (Ant+), the output circuit transmits the plurality of first images, the plurality of second images, and the plurality of depth maps to an operation apparatus located in a cloud, and the operation apparatus generates the color three-dimensional scan result according to the plurality of first images, the plurality of second images, and the plurality of depth maps.

22. The attachable three-dimensional scan module of claim 1, further comprising:
a light source emitting a predetermined light pattern to the object, wherein when the corresponding distance exists between the first image sensor and the object, a ratio is determined according to a size of a predetermined light pattern formed on a surface of the object and a size of the predetermined light pattern emitted by the light source, wherein the light source has an emitting angle.

23. The attachable three-dimensional scan module of claim 22, further comprising:
a lookup table storing relationships of the corresponding distance, the ratio, the emitting angle, and the corresponding depth map.

24. The attachable three-dimensional scan module of claim 1, wherein the object is moved or rotated.

* * * * *